United States Patent [19]

Emmons et al.

[11] 4,400,413
[45] Aug. 23, 1983

[54] ACRYLIC POLYMER CONCRETE COMPOSITIONS

[75] Inventors: William D. Emmons, Huntingdon Valley; Joseph A. Lavelle, Coopersburg, both of Pa.

[73] Assignee: Rohm and Haas Company, Philadelphia, Pa.

[21] Appl. No.: 283,091

[22] Filed: Jul. 16, 1981

Related U.S. Application Data

[63] Continuation-in-part of Ser. No. 182,560, Aug. 29, 1980, abandoned.

[51] Int. Cl.$^3$ ............................. C08J 3/20; C08K 3/36
[52] U.S. Cl. .................................. 427/136; 523/218; 524/554; 427/140; 427/407.1; 526/230; 526/282; 428/63
[58] Field of Search .................... 260/42.52; 526/230, 526/282; 427/407.1, 136, 140; 523/218; 428/63; 524/554, 853

[56] References Cited

U.S. PATENT DOCUMENTS

| | | | |
|---|---|---|---|
| 2,414,089 | 1/1947 | Bruson | 260/410 R |
| 2,795,564 | 6/1957 | Conn et al. | 260/29.6 |
| 3,085,907 | 4/1963 | Zdanowski et al. | 117/126 |
| 3,150,032 | 9/1964 | Rubenstein | 161/161 |
| 3,575,785 | 4/1971 | McManimie et al. | 161/162 |
| 3,627,659 | 12/1971 | Marx et al. | 204/159.22 |
| 3,642,750 | 2/1972 | Wegemund et al. | 117/12 X |
| 3,650,669 | 3/1972 | Osborn et al. | 8/115.5 |
| 3,703,596 | 11/1972 | Marx et al. | 260/29.6 TA |
| 4,037,038 | 7/1977 | Tsuchiya | 526/56 |
| 4,048,259 | 9/1977 | Wegemund et al. | 526/208 |
| 4,097,677 | 6/1978 | Emmons et al. | 526/220 |
| 4,131,580 | 12/1978 | Emmons et al. | 260/29.6 RW |
| 4,141,868 | 2/1979 | Emmons et al. | 260/29.6 RB |
| 4,145,503 | 3/1979 | Emmons et al. | 526/282 |
| 4,197,225 | 4/1980 | Emmons et al. | 260/42.53 |
| 4,234,711 | 11/1980 | Emmons et al. | 526/282 |
| 4,299,761 | 11/1981 | Emmons et al. | 260/42.53 |

OTHER PUBLICATIONS

Chem. Abs. 7530e, "Storing Varnishes", vol. 75, (1971).
Chem. Abs. 153046t, "Anticorrosives . . . ", Marx et al, vol. 75, (1971).
JACS, vol. 68 (6), 1946, Bartlett et al.
Berry et al, "Rubber World", vol. 70 (#3), pp. 42-47, (1974).

*Primary Examiner*—John C. Bleutge
*Assistant Examiner*—Herbert J. Lilling
*Attorney, Agent, or Firm*—L. E. Johnson; A. R. Sluzas

[57] ABSTRACT

There are disclosed polymer concrete compositions of essentially anhydrous character comprising (1) an inert inorganic particulate material, such as sand, crushed stone or rock, and mixtures thereof, mixed with (2) a monomer blend of (a) dicyclopentenyloxyalkyl methacrylate or acrylate and (b) hydroxyalkyl methacrylate to form a paste or slurry suitable upon addition thereto of (3) a polymerization catalyst of (a) an organic peroxide and an aromatic amine accelerator, or (b) a polyvalent metal salt or complex and an organic hydroperoxide, or (c) mixtures of (a) and 0.0005% to 2% by weight, based on total amount of monomers, of a polyvalent metal salt or complex, or (d) mixtures of (a) and (b), to be used to form or to patch previously formed or laid, concrete floors and road pavements or as a coating for a variety of substrates such as metal and plastic sheet.

13 Claims, No Drawings

ACRYLIC POLYMER CONCRETE COMPOSITIONS

BACKGROUND OF THE INVENTION

This is a continuation-in-part of U.S. Ser. No. 182,560 filed Aug. 29, 1980 and now abandoned.

FIELD OF THE INVENTION

This invention concerns polymer concrete compositions, that is, composite materials formed by polymerizing one or more monomers in the presence of an inert inorganic particulate or granular material. The polymerized monomers serve as the binder for the product polymer concrete. For brevity, the expression "polymer concrete" is sometimes referred to hereinafter by the expression "PC".

PRIOR ART AND RELATED APPLICATIONS

McManimie, et al., U.S. Pat. No. 3,575,785 issued Apr. 20, 1971, disclose a process for covering an architectural surface by applying thereto a preformed resinous covering composition comprising (1) an inorganic filler pretreated with an organosilane coupling agent and (2) a polyalkyl methacrylate.

Zdanowski, et al., U.S. Pat. No. 3,805,907 issued Apr. 16, 1967, disclose a process for preparing a coated cement product comprising applying to a formed but uncured, heated asbestos-cement composition a coating of an aqueous dispersion containing a linear copolymer of a predominant amount of methyl methacrylate with a minor amount of a comonomer and an organic solvent (fugitive plasticizer) and heating the coated composite to remove the plasticizer and to cure the coated cement composite.

Rubenstein, U.S. Pat. No. 3,150,032 issued June 25, 1956, discloses prestressed preloaded articles of manufacture having a core of porous material strengthened by a first plastic resin surface structure integrated with and bonded to said core, and fibrous material, and optionally a filler of silicates and decorative material, disposed in a second plastic resin surface structure. The articles constitute, for example, chairs and tables. A wide variety of resins useful in making the articles is disclosed in the patent in columns 25-27, for example, unsaturated polyesters cross-bonded with an active unsaturated monomer vulcanizing agent in column 25, lines 18-22 and column 26, lines 39-42.

Bruson, U.S. Pat. No. 2,414,089 issued Jan. 14, 1947, discloses the preparation of esters of hydroxydicyclopentadiene with unsaturated monocarboxylic acids such as acrylic acid and methacrylic acid. The resulting esters are disclosed to be useful as vehicles for paints, varnishes and similar coating materials. Also, at column 4, lines 53-55, the patent discloses that the esters are useful as impregnants for sand cores in molding.

Emmons, Nyi and Sperry, U.S. Pat. No. 4,197,225 issued Apr. 8, 1980, which is a continuation-in-part of U.S. Ser. No. 687,856 filed May 19, 1976 and now-abandoned, and copending U.S. Ser. No. 3,055 filed Jan. 12, 1979, which is also a continuation-in-part of Ser. No. 687,856, in the hands of a common assignee, which assignee is the same assignee to which the present application is assigned, disclose the production of a polymer concrete using dicyclopentenyl acrylate or methacrylate as a binder for an aggregate material, such as sand and crushed stone. These two monomers used separately or as a mixture thereof, have been generically referred to by the designation DCP(M)A, the individual monomers being specifically designated DCPA and DCPMA, respectively, in the applications and patent identified above.

While the DCP(M)A mentioned has been found quite useful in the application, that is, utility mentioned, nevertheless, DCP(M)A, in spite of low volatility, has an odor that is quite characteristic, pervasive, persistent, and objectionable. The odor is a serious disadvantage especially when the PC is applied indoors for laying or patching industrial floors or even when it is applied outdoors for laying or patching patios, roads, bridge decks and the like. Furthermore, the use of DCP(M)A tends to produce an extremely hard covering which may require considerable plasticizer to prevent facture when the product is subjected to severe impact in use, a not unusual occurrence in the case of industrial floors and roads.

Emmons and Nyi, U.S. Pat. No. 4,097,677 issued June 27, 1978, broadly disclose polymer concrete compositions wherein dicyclopentenyloxyalkyl methacrylate and acrylate are disclosed as the binder component for the inorganic powdered or granular material. See columns 25-26.

Emmons and Nyi, U.S. Pat. No. 4,145,503 issued Mar. 20, 1979, disclose, as autoxidizable compositions, soluble linear addition polymers of dicyclopentenyloxyalkyl methacrylate or acrylate, and coating and/or impregnating compositions of dicyclopentenyloxyalkyl methacrylate or acrylate, a drying oil or a film-forming addition or condensation polymer, a polyvalent metal salt or complex catalyst and, optionally, a volatile oxime stabilizer.

Emmons and Nyi, U.S. Ser. No. 21,660 filed Mar. 19, 1979, assigned to the same assignee to which the present application is assigned, disclose a polymer concrete composition comprising an essentially anhydrous slurry of (a) an inert inorganic particulate aggregate in (b) dicyclopentenyloxyethyl acrylate or dicyclopentenyloxyethyl methacrylate or a mixture thereof, the slurry containing dissolved therein a curing catalyst consisting essentially of (c) an organic peroxide or hydroperoxide and/or (d) a polyvalent metal salt drier.

Compared to DCP(M)A, the dicyclopentenyloxyethyl acrylate and methacrylate are liquid reactive monomers having substantially lower volatility and a substantially higher flash point and practically no odor so that PC compositions containing them can be spread out, as by trowelling, to form or patch a floor indoors or to form or patch a concrete pavement on a road or highway even in hot weather, without developing obnoxious odor at the work site.

While dicyclopentenyloxyethyl methacrylate and acrylate have thus been found useful, and advantageous over the previous use of methyl methacrylate and DCP(M)A, in polymer concrete compositions, there remains a need for further improvement in the chemical resistance of polymer concrete produced using dicyclopentenyloxyethyl methacrylate as the binder relative to PC products made using epoxy resins as the binder. Also, the relatively high cost of the use of dicyclopentenyloxyethyl methacrylate when compared with the lower cost of epoxy resins is a disadvantage for the use of the former monomer as the binder in PC.

DESCRIPTION OF THE INVENTION

According to the present invention, an essentially anhydrous polymer concrete (PC) using an acrylic binder monomer with an inert inorganic particulate or granular aggregate material is provided which affords improved chemical resistance and reduced cost. The expression "essentially anhydrous" is not meant to exclude minor amounts of water, e.g., up to 1% moisture in the inorganic particulate or granular aggregate material.

The present invention comprises an acrylic polymer concrete composition comprising an essentially anhydrous slurry of (1) an inert inorganic particulate or granular aggregate material have a void fraction of less than 0.37; in admixture with (2) from about 10% to 35% by weight, based on component (1), of a non-volatile binder monomer system comprising
  (a) from about 25% to 75% by weight, based on total of monomers, of at least one dicyclopentenyloxyalkyl ester of a polymerizable α,β-unsaturated monocarboxylic acid selected from methacrylic acid or acrylic acid, the dicyclopentenyloxyalkyl ester being represented by the formula

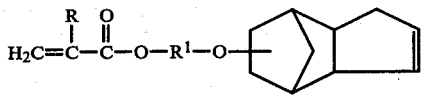

wherein R is $CH_3$ or H, and $R^1$ is selected from (i) alkylene groups having 2 to 6 carbon atoms and (ii) oxaalkylene groups having 4 to 6 carbon atoms and having one or more oxygen atoms joining distinct segments of the alkylene chain, each segment having at least 2 carbon atoms, and
  (b) from about 75% to 25% by weight, based on total of monomers, of at least one hydroxyalkyl methacrylate represented by the formula

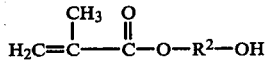

wherein $R^2$ is a straight or branched chain ($C_1$–$C_6$) alkyl group of a ($C_3$–$C_6$) cycloalkyl group, the total of monomers being 100%; and (3) a polymerization catalyst selected from
  (a) about 0.1% to 3% by weight, based on total of monomers, of a ($C_3$–$C_{18}$) hydrocarbyl peroxide with about 0.1% to 5% by weight, based on total of monomers, of an aromatic amine polymerization accelerator, or
  (b) about 0.1% to 3% by weight, based on total of monomers, of a ($C_3$–$C_{18}$) hydrocarbyl hydroperoxide with about 0.0005% to 2% by weight, based on total of monomers, of a polyvalent metal salt or complex, or
  (c) mixtures of (a) and 0.0005% to 2% by weight, based on total amount of monomers, of a polyvalent metal salt or complex, or
  (d) mixtures of (a) and (b).

It has surprisingly and unexpectedly been discovered that the use of the blend of the hydroxyalkyl methacrylate with the dicyclopentenyloxyalkyl methacrylate or dicyclopentenloxyalkyl acrylate as the binder monomer system according to the invention provides a combination of advantageous properties including improved chemical resistance without significant concommitant reduction in water resistance and wet strength which would be predicted with increasing amounts of hydrophilic monomer, improved physical performance properties of cured articles produced from the PC (tensile strength, flexural stress, flexural strain, flexural modulus and shear bond adhesion), and low volatility (high flash point).

The dicyclopentenyloxyalkyl methacrylate and acrylate esters used in the invention as one of the two required components in the binder monomer system, defined by formula I above, are known compounds. These ester-ether compounds and methods for their preparation are disclosed in U.S. Pat. No. 4,097,677 mentioned above. Preferably, this component of the binder monomer system comprises at least one member selected from the group consisting of dicyclopentenyloxyethyl methacrylate, dicyclopentenyloxyisopropyl methacrylate, dicyclopentenyloxyisopropyl acrylate, and dicyclopentenyloxyneopentyl methacrylate. Dicyclopentenyloxyethyl methacrylate is most preferred.

The hydroxyalkyl methacrylate esters used in the invention as the other of the two required components in the binder monomer system, defined by formula II above, are well-known compounds. Preferably, this component comprises at least one of hydroxyethyl methacrylate (HEMA) and hydroxypropyl methacrylate (HPMA).

As mentioned above, the binder monomer system comprises from about 10% to 35% by weight, preferably from about 12% to 20% by weight, especially preferably about 15% by weight, based on the amount of aggregate material, of the PC composition. The relative amounts of the dicyclopentenyloxyalky ester component and the hydroxyalkyl methacrylate component of the binder monomer system can vary from about 25% to 75% by weight, respectively, based on the total of monomers, the total being 100%.

By the expression "non-volatile" as applied to the binder monomer system of the PC according to the invention, it is intended that the monomers or mixtures thereof must have a vapor pressure/reactivity balance under the conditions of ambient temperature cure such that no more than about 5% by weight of binder monomers is lost by evaporation prior to complete cure or polymerization.

In general, the aggregate is a particulate or granular material ranging in particle size from about 100 microns to about 2-mesh (U.S. wire screen standard). Generally, a mixture of different-sized graded aggregates is used, especially when an aggregate material having a large size in the upper part of the range mentioned is one component of the aggregate. Such large-sized aggregate is mixed with smaller sizes of aggregate to minimize void volume, especially to achieve void volumes of less than 0.37, preferably less than 0.20 and optimally about 0.15 or less, to thereby reduce the amount of liquid monomer required to fill the voids and thereby minimize the overall polymerization shrinkage and cost of the monomer component.

The aggregate material used herein may be any inert inorganic substance that is resistant to such organic and inorganic acids, salts, and alkalis as may be encountered in common industrial plants, e.g., hydrochloric acid, sulfuric acid, nitric acid, sulfonic acid, phosphoric acid, acetic acid, formic acid; sodium, potassium, calcium, and magnesium salts, e.g., the chlorides, sulfates and alkali metal and alkaline earth metal hydroxides. Examples of suitable aggregates include sand, silica flour, crushed rocks or stones of quartz, granite, feldspar, gneiss, basalt, porphyry, and small pebbles thereof. The sand that may be used may be of any quality or of any size in the range specified above, preferably having a diameter of about 1 mm or less. Graded sand of medium particle size such as "Ottawa" sand and "Best" sand or a mixture of the two may be used to better advantage. Ottawa sand is a silica sand of the type referred to as "round". Best sand is of the type known as "sharp". In both cases, fines will have been removed. In general, however, the sieve size of the sand may vary over a fairly wide range. In lieu of or in addition to sand, it is possible to use fractured colored glass marbles, ground glass, silica flour, emery powder, ground slag, and fine gravel.

The addition of a polyvalent metal salt or complex, preferably with an organic hydroperoxide, in small amounts, can be made to the mixture prior to molding. The proportion of metal salt or complex added to the composition before molding may be from 0.0005 weight percent up to about 2 weight percent, and the amount of hydroperoxide may be in the range of 0.1 to 3 weight percent, based on the total weight of the monomers.

Similarly, the addition of an organic peroxide, with an aromatic amine accelerator, and optionally with a polyvalent metal salt or complex, can be made to the mixture prior to molding. The proportion of the organic peroxide to the composition may be in the range of 0.1 to 3 weight percent and the aromatic amine accelerator is used in an effective amount, usually in the range of about 0.1 to 5 weight percent.

The polyvalent metal salt or complex and hydroperoxide, or the aromatic amine accelerator and peroxide, may be kept in separate packages and shipped separately to the site of operations where the respective components may be combined and where the composition of the present invention is to be molded, as by pouring or trowelling to lay or patch a concrete floor or base or pavement. Alternatively, the aromatic amine accelerator and binder monomer system, and the organic peroxide and the aggregate material, respectively, may be combined in packages for storing and shipping prior to combining them to provide the composition of the invention shortly before casting or molding the composition.

The composition may be colored by the choice of a colored aggregate or by including within the aggregate or within the composition a suitable amount of pigment or dye dissolved in the binder monomer system. The amount of such pigment or dye may vary from about 1% to 10% by weight of the composition.

The polyvalent metal salt or complex used in the invention may be any polyvalent metal-containing salt that catalyzes the oxidative curing of drying oils and, when added to oil-based varnishes and paints, hastens the drying or curing thereof. These metal salts or complexes are also known, in the art, as "siccatives" or "driers". Such substances include the polyvalent metal salts of higher aliphatic acids, such as the butyrate, pentanoate, hexanoate, and especially the salts of higher aliphatic acids having from 8 to 30 carbon atoms or of naphthenic acids that provide solubility in the binder monomer system. Generally, the most useful drier salts for the binder monomer system compositions of the present invention are salts of naphthenic acids or of ($C_8$ to $C_{30}$) aliphatic acids. Examples of the polyvalent metal include calcium, copper$^{II}$, zinc$^{II}$, manganese$^{II}$, manganese$^{III}$, lead$^{II}$, cobalt$^{II}$, iron$^{III}$, vanadium$^{II}$, and zirconium$^{IV}$. These salts or complexes accelerate the action of the organic hydroperoxide and promote oxidative curing in the organic peroxide-amine catalyst system. Other examples of the acid component or anion of the drier salt are those of resinic acids, (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. The mixture of drier salts may be used.

Preferred drier salts are those of cobalt and manganese, such as cobalt, octoate, cobalt naphthenate, cobalt acetylacetonate and manganese octoate, manganese naphthenate, and manganese acetylacetonate.

Aromatic amines may be used in small amounts with the organic peroxides and generally accelerate the action of the peroxide. For example, aniline, N,N-dimethylaniline, N,N-diethylaniline, toluidine, N,N-dimethyl p-toluidine, N,N-di(hydroxyethyl) toluidine, and p-dimethylaminobenzaldehyde may be added for this purpose in an amount of 0.1 to 2 percent by weight of the binder monomer system.

The organic peroxides and hydroperoxides that may be used include the peroxides and the hydroperoxides derived from hydrocarbons which contain from about 3 to 18 carbon atoms so that they are soluble in the binder monomer system. Suitable organic hydroperoxides include tertiary-butylhydroperoxide, cumene hydroperoxide, methyl ethyl ketone hydroperoxide and diisopropylbenzene hydroperoxide. Suitable peroxides include benzoyl peroxide, tertiary-butylperbenzoate, 2,2-bis-(tert-butylperoxy)-butane, bis-(1-hydroxy-cyclohexyl)-butane, bis-(1-hydroxy-cyclohexyl)-peroxide, and tert-butylperoxy-isopropyl carbonate.

A more preferable polymerization catalyst is a mixture of an organic peroxide and an aromatic amine. An especially preferable polymerization catalyst is a mixture of benzoyl peroxide and N,N-dimethyl p-toluidine.

The formation of the composition by molding may be accomplished in any desired way. For example, the mixture comprising the binder monomer system, aggregate, drier, and peroxide may be poured into suitable molds as in the casting of concrete floors or pavements or in the casting of cements that may later be ued as wall or ceiling tiles or panels. When using it for this purpose or for repairing or patching worn or damaged floors, patios or parking lot bases, or concrete road pavements or highway and bridge decks, the mixture of the binder monomer system may be so proportioned as to provide a trowellable composition to lay relatively thin layers form 1/16 to ½ inch thick. If additional viscosity is needed in such compositions to facilitate trowelling or other forming actions, a thickening agent or rheological control agent may be included.

The formation may be accomplished at ambient temperature. In any event, the composition with which the present invention is concerned may be completely free of volatile substances so that shrinkage that is difficult to control when other compositions having volatile components are used is avoided.

The PC composition may be utilized for coating substrates such as metal, glass and plastics by conventional application techniques in order to provide surfaces having advantageous chemical resistance.

The use of both organic peroxide and aromatic amine accelerator or organic hydroperoxide and polyvalent metal salt drier serves to ensure the curing of the formed PC to a solid state in a relatively short time, such as from 5 to 30 minutes. However, curing of the surface may require additional drying time such as up to 24 hours or so to overcome tackiness because of the inhibition of polymerization of the binder monomers by free radical action occurring at the air/surface interface. This initial tackiness may be overcome more rapidly by coating of the exposed surface(s) shortly after initial hardening of the composition with a free radical initiator contained in a suitable immiscible liquid that will exclude air from the surface after application thereof thereto.

The compositions described hereinabove are generally hard and tough when cured. When it is desired to render such compositions more flexible, a small proportion of a drying oil, such as linseed oil, or of an acrylic polymer having a low second order transition temperature ($T_g$), such as poly(ethyacrylate), poly(butylacrylate), or poly(2-ethylhexylacrylate), or of a mixture of a drying oil and low $T_g$ acrylic polymer, may be added to the dicyclopentenloxyalkyl(meth)acrylate-hydroxyalkyl methacrylate composition and may replace part of the binder monomer system. Alternatively, the required binder monomers may be used with a small proportion of an auxiliary liquid monomeric acrylic and/or vinyl ester binder forming material which is of low volatility and can reduce the hardness and impart a more flexible or resilient character to the final composition. A mixture of a drying oil and an auxiliary monomer may also be used. Such other acrylic ester monomers include ($C_{12}$–$C_{30}$) alkyl, or ($C_{12}$–$C_{30}$) alkenyl, acrylates or methacrylates such as lauryl acrylate, myristyl acrylate, palmityl acrylate, oleyl acrylate, linoleyl acrylate, linolenyl acrylate, stearyl acrylate; similar improvements in flexibility may be obtained by including with the required binder monomers long chain ($C_{12}$–$C_{30}$) aliphatic acid vinyl esters, e.g., vinyl laurate, vinyl oleate, vinyl stearate or di($C_4$–$C_8$)alkyl esters of maleic acid, fumaric acid, or itaconic acid, e.g., the dibutyl, dihexyl, or dioctyl fumarate, maleate, or itaconate. The required binder monomers may also be used with small proportions of multi-functional, i.e., polyethylenically unsaturated, monomers such as polyol (meth)acrylates and polyalkylene polyol (meth)acrylates, such as ethylene glycol diacrylate or dimethacrylate, trimethylolpropane triacrylate or trimethacrylate, triethylene glycol (meth)acrylate, etc. All of these monomeric materials have low volatility and are polymerizable by the action of the peroxide and the metal salt drier to form products having greater toughness and resistance to water, organic solvents, acids, and alkali. The proportion of these auxiliary monomers, if used, may be from about ½ percent to 25% by weight of the binder monomer system component, but preferably is not over about 20% by weight of such component.

The PC of the present invention is especially useful in the laying (and especially patching) of acid-, alkali-, and salt-resistant as well as organic solvent-resistant industrial flooring, basement flooring, pavements, roads, bridges, and ship decks or floors. In all such structures, the cured product is resistant to water, organic solvents, such as gasoline, and highly corrosive media such as acids, salts, and alkalis. The PC of the present invention may also be used as a coating for a variety of substrates such as metal and plastic sheet.

Besides the pigments and dyes mentioned above, other well-known adjuvants can be included in the PC compositions of the invention, including, for example, antioxidants and antiozidants, inhibitors, stabilizers and flow control agents.

In the following examples illustrating but a few embodiments of the invention, the parts and percentages are by weight and the termperatures are in Celsius or Centigrade degrees unless otherwise stated. The mesh size given for the aggregate material used is based on the standard U.S. wire screen.

The following abbreviations are used to designate the corresponding compounds:

| | |
|---|---|
| DCPOEMA | = dicyclopentenyloxyethyl methacrylate |
| DCPOiPMA | = dicyclopentenyloxyisopropyl methacrylate |
| DCPOiPA | = dicyclopentenyloxyisopropyl acrylate |
| DCPONMA | = dicyclopentenyloxyneopentyl methacrylate |
| HEMA | = hydroxyethyl methacrylate |
| HPMA | = hydroxypropyl methacrylate |

The following tests are employed to evaluate the physical properties of the cured polymer concrete articles of manufacture produced from the polymer concrete compositions of the invention:

| | |
|---|---|
| Compressive Strength | ASTM C-109-73 |
| Tensile Strength | ASTM C-190-72 |
| Flexural Strength | ASTM C-348-72 |
| Shear Bond Adhesion | "Test Methods for the Evaluation of Cement Modifiers," Rohm and Haas Company, Philadelphia, PA 19105, Technical Bulletin 83D2, April 1977, page 4. |
| Flash Point | Set a Flash Closed Cup Method ASTM D-32-78 |

It is to be understood that commercial grade hydroxyethyl methacrylate and hydroxypropyl methacrylate monomers are used and that, as is known in the art, such commercial grade monomers generally contain about 90% and 92%, respectively, of the desired ester product, the balance to 100% being high boiling methacrylate compounds, methacrylic acid, dimethacrylate compounds and the corresponding alkylene oxide.

EXAMPLE 1. EFFECT OF HEMA AND HPMA ON FLASH POINT OF DCPOEMA

2-Hydroxyethyl methacrylate (HEMA) and hydroxy propyl methacrylates (HPMA) are physically blended at varying weight ratios with DCPOEMA. The flash point of the respective blends is measured by a standard Setaflash closed cup test method. The results are summarized in Table 1 below.

TABLE I

Setaflash Closed Cup Flash Points of DCPOEMA/ Hydroxyalkyl Methacrylate Monomer Blends

| % | Setaflash Point (°F.) | | | | |
|---|---|---|---|---|---|
| Hydroxyalkyl Methacrylate | 0[a] | 25 | 50 | 75 | 100 |
| HEMA | >230 | >230 | 224 | 218 | 210 |
| HPMA | >230 | >230 | 220 | 208 | 204 |

[a]100% DCPOEMA

The results shown in Table I demonstrate that the use of HPMA or HEMA lowers the flash point of DCPOEMA. Even at levels of hydroxyalkyl methacrylate >50% the flash point is still >200° F. which represents a range in which even bulk shipments would be regulated by Dept. of Transportation combustible codes and would not require red labeling.

EXAMPLE 2. EVALUATION OF A PC COMPOSITION BASED ON DCPOEMA CONTAINING VARIOUS LEVELS OF A HYROXYALKYL METHACRYLATE ESTER AS COMONOMER

Hydroxypropyl methacrylate (HPMA), typical of the hydroxyalkyl methacrylate ester employed as a comonomer in the binder monomer system in the PC compositions of the invention, is blended at varying weight ratios with DCPOEMA and the resulting blends are mixed with other ingredients to provide a PC composition according to the following typical PC formulation. In the formulation, the aggregate material is selected on a basis that allows the use of a minimum level of acrylate monomer(s) which still provides good workability (trowelability). The initiator system involves the use of cobalt naphthenate/cumene hydroperoxide as a room temperature source of free radicals. Other initiator systems, such as benzoyl peroxide and amine promoter (e.g., dimethyl p-toluidine), or p-dimethylaminobenzaldehyde) and polyvalent metal salt or complex (e.g., cobalt naphthenate), can be readily substituted for that used herein. The results of the evaluation of physical (mechanical) properties of the resulting polymerized (cured) PC articles are summarized in Table II which follows the formulation set forth below.

| Acrylic PC Composition Formulation | |
|---|---|
| | Parts |
| Dry Mix Materials | |
| No. 2 Sand (Pettinos) | 41.07 |
| No. 45 Sand (Pettinos) | 41.07 |
| Silica Flour 120 | 17.35 |
| Fe$_3$O$_4$ (Pfizer) | 0.05 |
| TiO$_2$ (duPont R-960 ®) | 0.46 |
| To 100 gms of dry mix add: | |
| Premix[1] | |
| Binder Monomer System | 17.78 |
| Cumene Hydroperoxide (73%) | 0.36 |
| Cobalt Naphthenate (6% active metal) | 0.095 (6 drops) |

[1]Premix is prepared just prior to using. Cumene hydroperoxide is thoroughly mixed with acrylate monomer(s) before addition of the cobalt naphthenate.

TABLE II

Mechanical Properties[1] of Acrylic Polymer Concretes Based on DCPOEMA/HPMA Blends

| % HPMA | 0 | 25 | 50 | 100 |
|---|---|---|---|---|
| Monomer Blend Flash Point (°F.) | >230 | >230 | 220 | 204 |
| Compressive Strength (psi) | | | | |
| 7 days 23° C. | >6000 | >6000 | >6000 | >6000 |
| Tensile Strength (psi) | | | | |
| 7 days 23° C. | 862 | 480 | 505 | 560 |
| Flexural Strength (7 days at 23° C.) | | | | |
| Stress (psi) | 2747 | 2902 | 4166 | 3482 |
| Strain (in./in.) | .002 | .0013 | .0016 | .0016 |
| Modulus (psi) × 10$^6$ | 1.5 | 2.3 | 2.6 | 2.2 |
| Shear Bond Adhesion (psi) | | | | |
| 7 days @ 23° C. | 690C[2] | 750C | 700C | 600C |
| 7 days @ 23° C. + 7 days water soak | 620C | 600C | 600C | Not tested patch |

TABLE II-continued

Mechanical Properties[1] of Acrylic Polymer Concretes Based on DCPOEMA/HPMA Blends is spongy

[1]Tests methods are identified at page 13 above.
[2]C = cohesive failure in base of test block.

The data in Table II indicate that the use of HPMA does not result in a drastic change in compressive or tensile strength. Some increase in flexural properties is observed at levels of HPMA of 50% or greater. However, the most significant result is that the use of 100% HPMA results in a totally unacceptable level of wet adhesive strength whereas the use of DCPOEMA/HPMA blends gives acceptable (indeed outstanding) adhesion even at 50% concentration of HPMA. The wet adhesion of HPMA is so poor it does not appear to be obvious that levels of 50% could be tolerated with DCPOEMA and the advantageous result is neither expected nor predictable.

EXAMPLE 2A. POLYMER CONCRETE COMPOSITION BASED ON DCPOEMA WITH COMBINATION INITIATOR SYSTEM

The PC composition of Example 2 was evaluated with an initiator system including cobalt naphthenate N,Ndimethylaminobenzaldehyde and benzoyl peroxide formulated as follows:

| Acrylic PC Composition Formulation | |
|---|---|
| | Parts |
| Dry Mix Materials | |
| No. 2 Sand (Pettinos) | 41.08 |
| No. 45 Sand (Pettinos) | 41.08 |
| Silica Flour 120 | 17.34 |
| Fe$_3$O$_4$ (Pfizer) | 0.05 |
| TiO$_2$ (duPont R-960 ®) | 0.45 |
| Benzoyl Peroxide (powder) (Cadox ® BFF-50 ®, 50% active, Noury Chemical Corporation) | 0.71 |
| Catalyst 4142* (Mooney Chemical Co.) | 0.2 |
| To 100 gms. of dry mix add: | |
| Premix[1] | |
| Binder Monomer System[2] | 17.78 |
| p-Dimethylaminobenzaldehyde | 0.72 |

[1]N,N—Dimethylbenzaldehyde is thoroughly mixed with acrylate monomer(s) before addition to the dry mix.
[2]DCPOEMA:HPMA = 50:50
*Catalyst 4142 is a cobalt carboxylate (11.2% active)

This formulation provides a PC composition having properties set forth in Table IIA which follows:

TABLE IIA

Properties of Acrylic PC Composition of Example 2A.

| Property | Measurement |
|---|---|
| Pot Life | 0.66 hr. |
| Cure Speed (bulk) | 2 hr. |
| Cure Speed (surface) | 2-4 hr. |
| Compressive Strength | >6000 psi |
| Tensile Strength | 1198 psi |
| Flexural Strength (7 days at 23° C.) | |
| Stress | 3839 psi |
| Strain | 0.0018 (in./in.) |
| Modulus | 2.1 ⊗ 10$^6$ |
| Shear Bond Adhesion (7 days at 23° C.) | 926 psi |
| (7 days at 23° C. + 7 days water soak) | 630 psi |
| Chemical Resistance | |

TABLE IIA-continued

Properties of Acrylic PC
Composition of Example 2A.

| Property | Measurement |
|---|---|
| 20% Acetic Acid | No Effect (NE) |
| Gasoline | NE |
| 50% Ethanol | Very Slight Surface Softening |
| Xylene | NE |
| 50% Sodium Hydroxide | NE |
| Water | NE |
| Toluene | NE |
| Hydrochloric Acid (37%) | NE |
| Ammonium Hydroxide (28) | NE |

EXAMPLE 3. COMPARISON OF HPMA AND HEMA AS COMONOMER WITH DCPOEMA FOR WET ADHESION IN ACRYLIC POLYMER CONCRETE

Using the formulation given in Example 2, a series of polymer concrete compositions is prepared containing various levels of HPMA and HEMA with DCPOEMA. Shear bond adhesion measurements are carried out under both wet and dry conditions.

ilarly, the maximum level of HEMA with DCPOEMA is between 50–75%.

EXAMPLE 4. CHEMICAL RESISTANCE OF ACRYLIC POLYMER CONCRETES

An important performance requirement for an industrial flooring application using polymer concrete is that of resistance to attack by acids, bases and a variety of solvents. Specimens of the various acrylic polymer concrete compositions are cast using the formulation listed in Example 2. The specimens are allowed to cure for 7 days at room temperature (23° C., 50% R.H.; R.H. = Relative Humidity). They are then immersed in 50 cc of the test liquid. The degree of attack by the test liquid is rated qualitatively after 14 days according to the following criteria:

Good—bulk and surface of specimen remain hard (unchanged)
Fair—bulk remains hard (unchanged) but surface softens
Poor—bulk and surface soften The results are summarized in Table IV below.

TABLE IV

| Binder Monomer System | Chemical/Solvent Resistance of Polymer Concrete[2] | | | | | | | | | | |
|---|---|---|---|---|---|---|---|---|---|---|---|
| | DCPOEMA | | | | | | | | | | |
| Comonomer | HPMA | | | | | HEMA | | | | Epoxy[1] | |
| % Comonomer | 0 | 25 | 50 | 75 | 90 | 100 | 25 | 50 | 75 | 100 | |
| | Acid Resistance | | | | | | | | | | |
| 10% Acetic Acid | Good | Good | Good | Fair | Fair | Poor | — | — | — | — | Fair |
| 10% Citric Acid | Good | Good | Good | Good | Fair | Poor | — | — | — | — | Good |
| 10% Hydrochloric Acid | Good | Good | Good | Good | Fair | Fair | — | — | — | — | — |
| 10% Lactic Acid | Good | Good | Good | Good | Fair | Poor | — | — | — | — | Fair |
| 37% Hydrochloric Acid | Good | Good | Fair | Fair | Fair | Fair | — | Fair | — | — | Good (stains) |
| | Miscellaneous Organic Solvents | | | | | | | | | | |
| Gasoline | Poor | Good | Good | Good | Good | Good | — | — | — | — | Good |
| Toluene | Poor | Poor | Good | Good | Good | Good | — | Good | — | — | Fair |
| Methyl Ethyl Ketone | Poor | Poor | Poor | Poor | Poor | Poor | — | Poor | — | — | Poor (acetone) |
| 50% Ethanol | Fair | Poor | Poor | Poor | Poor | Poor | — | — | — | — | Good |
| | Water and Alkali Resistance | | | | | | | | | | |
| Water | Good | Good | Good | Good | Poor | Poor | Good | Good | Poor | Poor | Good |
| 50% NaOH | Good | Good | Good | Good | Good | Good | — | Good | — | — | Good |
| 28% NH3 | Fair | Fair | Fair | Poor | Poor | Poor | — | — | — | — | Good |

[1]Commercial epoxy concrete flooring available from Tremco - literature results.
[2]One week dry, followed by two weeks immersion.
Rating criteria:
Good = bulk/surface hard (unchanged)
Fair = bulk/hard (unchanged), surface softened
Poor = bulk/surface softened The results on Table 4 indicate that hydroxyethyl methacrylate (HEMA) can be added to DCPOEMA at

TABLE III

| Effect on Adhesion of HEMA and HPMA In Blends with DCPOEMA In Polymer Concrete | | | | | | | | | | |
|---|---|---|---|---|---|---|---|---|---|---|
| | | DCPOEMA | | | | | | | | |
| | (100% DCPOEMA) | HPMA | HEMA | HPMA | HEMA | HPMA | HEMA | HPMA | HPMA | HEMA |
| % Hydroxyalkyl Methacrylate | 0 | 25% | | 50% | | 75% | | 90 | 100% | |
| | Shear Bond Adhesion (psi) | | | | | | | | | |
| 14 days at 23° C. | 769C | 594C | 555C | 578C | 706C | 575C | 402C | — | 573 | 755 |
| 7 days at 23° C. + 7 days in H2O | 535C | 616C | 720C | 541C | 620C | 460C | 167 | Spongy | Spongy | |

The results in Table III demonstrate that, surprisingly and unpredictably, HPMA can be copolymerized with DCPOEMA in polymer concretes to provide a product which does not suffer a significant loss of wet adhesion until the 75% HPMA level is exceeded. Since the 90% HPMA sample is spongy when soaked, the maximum level of HPMA that can be tolerated with DCPOEMA with retention of wet strength is between 75–90%. Simlevels ranging from 50% but less than 75% before a loss in water resistance is observed. However, hydroxypropyl methacrylate (HPMA) shows good water resistance up to a range of 75% but less than 90%. Depending on the specific commercial aplication intended, the use of about 50% HPMA gives an advantageous balance of resistance to various chemicals but, obviously, depending on the specific reagent one wanted to resist, the level of comonomer can be shifted higher or lower.

EXAMPLE 5. ACRYLIC POLYMER CONCRETE HAVING ANALOGS OF DCPOEMA AS BINDER

Several analogs of DCPOEMA are used in PC compositions to evaluate the physical properties of PC articles produced therfrom as compared to articles produced from DCPOEMA. The PC compositions are formulated as follows and Table V below summarizes the physical properties of these PC products.

| Acrylic PC Compositions Formulation | |
|---|---|
| Material | Weight |
| No. 2 Sand (Pettinos) | 35 |
| No. 45 Sand (Pettinos) | 35 |
| Silica Flour 120 | 15 |
| Binder Monomer System | 15 |
| Cumene hydroperoxide (73%) | 0.3 |
| Cobalt Naphthenate (6%) | 0.09 |

The results in Table V show that both the -oxyneopentyl and the -oxyisopropyl methacrylate analogs of DCPOEMA show good adhesion properties. In addition, the oxyisopropyl acrylate analog is shown to be an acceptable binder monomer for producing polymer concrete.

TABLE V

Mechanical Properties of Polymer Concretes Based on DCPOEMA and Analogs Thereof

| Properties | Monomer | | | |
|---|---|---|---|---|
| | DCPOEMA | DCPONMA | DCPOiPMA | DCPOiPA |
| Tensile Strength (psi) | 795 (1000) | N/A | 813 | 993 |
| Flexural Stress (psi) | 2626 (2600) | N/A | 2061 | 2665 |
| Flexural Strain (in./in.) | .0008 (.0016) | N/A | .001 | .0119 |
| Flexural Modulus (psi) | $2.7 \times 10^6$ ($1.8 \times 10^6$) | N/A | $1.8 \times 10^6$ | $0.6 \times 10^6$ |
| Shear Bond Adhesion (dry - psi) | 806 | 534 | 815 | 598 |
| Shear Bond Adhesion (7 days dry/7 days wet - psi) | 653 | 393 | 391 | 415 |

EXAMPLE 6. CHEMICAL/SOLVENT RESISTANCE OF ACRYLIC POLYMER CONCRETE

Using the formulation given in Example 5, a series of polymer concrete compositions is prepared containing various acrylic binder monomer system compositions. Specimens of the respective acrylic polymer concrete compositions are cast, allowed to cure for 7 days at room temperature (23° C., 50% R.H.), and then immersed in 50 ml (cc) of the test liquid. The degree of attack by the test liquid is rated qualitatively after two weeks. Toluene and aqueous ammonia are selected as typical of chemicals and solvents. The results are summarized in Table VI which follows.

TABLE VI

Chemical/Solvent Resistance of Polymer Concrete[1]

| Binder Monomer System | Toluene | 28% NH$_3$ |
|---|---|---|
| DCPOEMA (100%) | Poor[2] | Fair[2] |
| DCPOiPA (100%) | Poor | Fair |
| DCPOiPMA (100%) | Poor | Fair |
| HPMA (100%) | Good[2] | Poor |
| HPMA/DCPOEMA (1/1 by weight) | Good | Fair |
| HPMA/DCPOiPA (1/1 by weight) | Good | Fair |

TABLE VI-continued

Chemical/Solvent Resistance of Polymer Concrete[1]

| Binder Monomer System | Toluene | 28% NH$_3$ |
|---|---|---|
| HPMA/DCPOiPMA (1/1 by weight) | Good | Fair |

[1]One week dry, followed by two weeks immersion.
[2]Rating System:
Good = bulk/surface hard (unchanged)
Fair = bulk hard (unchanged), surface softened
Poor = bulk/surface softened.

The results set forth in Table VI show that the resistance to toluene is poor for polymer concretes based on 100% DCPOEMA and analogs thereof. The resistance to ammonia is poor for 100% HPMA based concretes. The use of blends of DCPOEMA and analogs thereof with HPMA result in polymer concretes having a good balance of chemical resistance. The resistance to toluene is substantially upgraded without sacrificing any loss in resistance to ammonia.

EXAMPLE 7. EVALUATION OF A TWO-COMPONENT PC COMPOSITION BASED ON A BLEND OF DCPOEMA AND HPMA

A PC composition having as the binder monomer system a 1:1 weight ratio blend of DCPOEMA and HPMA is provided according to the following two-component formulation. The initiator system in this example involves the use of benzoyl peroxide and N,N-dimethyl-p-toluidine. This particular combination of organic peroxide and amine promoter provides short pot life of the blended components (about 3 minutes) and relatively rapid bulk cure of the PC (about 3–5 minutes). However, pot life and cure rate may be altered to provide adequate processing and handling time by the selection of equivalent, but slower reacting initiator system components. This two-component PC composition having an organic peroxide/amine promoter initiator system has the particular advantage compared with a typical PC composition having an organic hydroperoxide/metal salt or complex initiator system (exemplified in Example 2 above) that the PC composition ingredients may be provided, stored and shipped in only two packages whereas the use of the composition of Example 2 involves more than only two packages. The results of the evaluation of the mechanical properties of a polymerized (cured) PC article of this example are summarized in Table VII which follows the formulation set forth below.

Two-Component Acrylic PC Composition Formulation

| | Materials | Parts |
|---|---|---|
| | No. 2 Sand (Pettinos) | 41.08 |
| | No. 45 Sand (Pettinos) | 41.08 |
| Composition 1 | Silica Flour 120 | 17.34 |

-continued

| Two-Component Acrylic PC Composition Formulation | | |
|---|---|---|
| | Materials | Parts |
| | Fe$_3$O$_4$ (Pfizer) | 0.05 |
| | TiO (duPont R-960 ®) | 0.45 |
| | Benzoyl Peroxide (50% active) | 0.71 |
| Component 2 | To 100.71 gms above, add: DCPOEMA:HPMA (1:1 weight blend) | 17.78 |
| | N,N—Dimethyl-p-Toluidine | 0.36 |

TABLE VII

Mechanical Properties of Acrylic Polymer Concrete Article[1] Based on a Two-Component Formulation Containing Benzoyl Peroxide/N,N—dimethyl-p-Toluidine Initiator

| Property | Value |
|---|---|
| Compressive Strength (psi) | >6,000 |
| Tensile Strength (psi) | 1342 |
| Flexural Strength (psi) | 3208 |
| Flexural Strain (psi) | .0015 |
| Flexural Modulus | 2.2 · 10$^6$ |
| Shearbond Adhesion (psi) | 931 |

[1]Sample specimens equilibrated 7 days at 23° C. before testing.

The data in Table VII indicate that the use of the two-component PC composition containing an organic peroxide/amine promoter initiator system provides articles having advantageous mechanical properties equivalent to those obtained in a comparable PC composition having an organic hydroperoxide/metal salt or complex initiator system as exemplified in Example 2 above.

What is claimed is:

1. An acrylic polymer concrete composition comprising an essentially anhydrous slurry of
   (1) an inert inorganic particulate or granular aggregate material having a void fraction of less than 0.37; in admixture with
   (2) from about 10% to 35% by weight, based on the amount of aggregate material, of a non-volatile binder monomer system comprising
      (a) from about 25% to 75% by weight, based on total of monomers, of at least one dicyclopentenyloxyalkyl ester of a polymerizable α,β-unsaturated monocarboxylic acid selected from methacrylic acid or acrylic acid, the dicyclopentenyloxyalkyl ester being represented by the formula

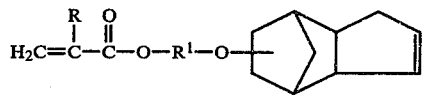

wherein R is CH$_3$ or H, and
R$^1$ is selected from
   (i) alkylene groups having 2 to 6 carbon atoms and
   (ii) oxaalkylene groups having 4 to 6 carbon atoms and having one or more oxygen atoms joining distinct segments of the alkylene chain, each segment having at least 2 carbon atoms, and
(b) from about 75% to 25% by weight, based on total of monomers, of at least one hydroxyalkyl methacrylate represented by the formula

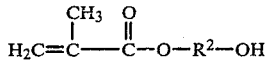

wherein R$^2$ is a straight or branched chain (C$_1$–C$_6$) alkyl group or a (C$_3$–C$_6$) cycloalkyl group, the total of monomers being 100%; and
   (3) a polymerization catalyst selected from
      (a) about 0.1% to 3% by weight, based on total of monomers, of a (C$_3$–C$_{18}$) hydrocarbyl peroxide with about 0.1% to 5% by weight, based on total of monomers, of an aromatic amine polymerization accelerator, or
      (b) about 0.1% to 3% by weight, based on total of monomers, of a (C$_3$–C$_{18}$) hydrocarbyl hydroperoxide with about 0.0005% to 2% by weight, based on total of monomers, of a polyvalent metal salt or complex,
      (c) mixtures of (a) and 0.0005% to 2% by weight, based on total amount of monomers, of a polyvalent metal salt or complex, or
      (d) mixtures of (a) and (b).

2. A composition according to claim 1 wherein the dicyclopentenyloxyalkyl ester is selected from dicyclopentenyloxyethyl methacrylate, dicyclopentenyloxyisopropyl methacrylate, dicyclopentenyloxyisopropyl acrylate, and dicyclopentenyloxyneopentyl methacrylate.

3. A composition according to claim 1 wherein the dicyclopentenyloxyalkyl ester is dicyclopentenyloxyethyl methacrylate.

4. A composition according to claim 1 wherein the hydroxyalkyl methacrylate is selected from hydroxyethyl methacrylate and hydroxypropyl methacrylate.

5. A composition according to claim 1 wherein the aggregate material may range in size from about 100 microns to about 2-mesh, the latter measure being based on the standard US wire screen dimension.

6. A composition according to claim 1 wherein
   (1) the inert organic particulate or granular aggregate material has a void fraction of less than 0.20 and a particle size ranging from about 100 microns to about 2-mesh measured on the standard U.S. wire screen dimension;
   (2) the non-volatile binder monomer system comprises from about 12% to 20% by weight of
      (a) from about 25% to 75% by weight, based on total monomers, of at least one of dicyclopentenyloxyethyl methacrylate, dicyclopentenyloxyisopropyl methacrylate, dicyclopentenyloxyisopropyl acrylate or dicyclopentenyloxyneopentyl methacrylate, and
      (b) from about 75% to 25% by weight, based on total of monomers, of at least one of hydroxyethyl methacrylate or hydroxypropyl methacrylate; and
   (3) the polymerization catalyst is selected from
      (a) (C$_3$–C$_{18}$) hydrocarbyl peroxide with an aromatic amine selected from aniline, N,N-dimethylaniline, N,N-diethylaniline, toluidine, N,N-dimethyl p-toluidine, N,N-di(hydroxyethyl) toluidine, or N,N-dimethylaminobenzaldehyde, or
      (b) a (C$_3$–C$_{18}$) hydrocarbyl hydroperoxide with a polyvalent metal salt of a (C$_8$–C$_{30}$) aliphatic acid or of naphthenic acid.

7. A composition according to claim 6 wherein (1) the non-volatile binder monomer system comprises
  (a) dicyclopentenyloxyethyl methacrylate, and
  (b) at least one of hydroxyethyl methacrylate and hydroxypropyl methacrylate; and
(2) the polymerization catalyst is selected from
  (a) a mixture of cumene hydroperoxide and cobalt naphthenate, or
  (b) a mixture of benzoyl peroxide and N,N dimethyl p-toluidine, or
  (c) a mixture of benzoyl peroxide, N,N-dimethylaminobenzaldehyde and cobalt naphthenate.

8. A composition according to claim 6 wherein
(1) the inert inorganic particulate or granular aggregate materials has a void fraction of about 0.15 or less;
(2) the non-volatile binder monomer system comprises about 15% by weight of
  (a) about 50% by weight, based on total of monomers, of dicyclopentenyloxyethyl methacrylate, and
  (b) about 50% by weight, based on total of monomers, of hydroxypropyl methacrylate; and
(3) the polymerization catalyst comprises cumene hydroperoxide and cobalt naphthenate.

9. A composition according to claim 6 wherein
(1) the inert inorganic particulate or granular aggregate material has a void fraction of about 0.15 or less;
(2) the non-volatile binder monomer system comprises about 15% by weight of
  (a) about 50% by weight, based on total of monomers, of dicyclopentenyloxyethyl methacrylate, and
  (b) about 50% by weight, based on total of monomers, of hydroxypropyl methacrylate; and
(3) the polymerization catalyst comprises benzoyl peroxide and N,N-dimethyl p-toluidine.

10. A method of patching worn or damaged areas of a concrete floor, base, or pavement on a highway or bridge-deck which comprises spreading a slurry according to claim 1 containing components (1), (2), and (3) on the areas needing repair, smoothing the surface applied slurry to be approximately flush with the adjacent unpatched areas, and letting the patches cure at ambient conditions.

11. A polymer concrete product obtained by curing a formed mass of the composition according to claim 1 by exposing said mass to air at ambient temperature.

12. A product obtained by the process of claim 8.

13. A two-package article of commerce adapted to be stored, transported to the site of use, and to be mixed to form the polymer concrete slurry of claim 1, one of the packages containing the aggregate (1) and the curing catalyst component (3), the other containing the liquid monomer component (2).

* * * * *